(12) United States Patent
Magarill

(10) Patent No.: US 6,461,000 B1
(45) Date of Patent: Oct. 8, 2002

(54) OPTICAL SYSTEMS FOR PROJECTION DISPLAYS

(75) Inventor: Simon Magarill, Cincinnati, OH (US)

(73) Assignee: U.S. Precision Lens Incorporated, Cincinnati, OH (US)

(*) Notice: Subject to any disclaimer, the term of this patent is extended or adjusted under 35 U.S.C. 154(b) by 0 days.

(21) Appl. No.: 09/528,630
(22) Filed: Mar. 20, 2000

Related U.S. Application Data

(60) Provisional application No. 60/141,443, filed on Jun. 29, 1999.

(51) Int. Cl.[7] .......................... G03B 21/14; G02B 27/10
(52) U.S. Cl. ............................ 353/81; 353/33; 348/771
(58) Field of Search .......................... 353/81, 98, 99, 353/31, 33, 34, 37; 348/771, 742, 743; 345/31; 359/831, 833

(56) References Cited

U.S. PATENT DOCUMENTS

| | | | | |
|---|---|---|---|---|
| 4,983,032 A | * | 1/1991 | Van Den Brandt | 353/30 |
| 5,309,188 A | * | 5/1994 | Burstyn | 353/33 |
| 5,442,414 A | * | 8/1995 | Janssen et al. | 353/98 |
| 5,552,922 A | * | 9/1996 | Magarill | 353/81 |
| 5,865,520 A | * | 2/1999 | Kavanagh et al. | 353/31 |
| 5,946,139 A | * | 8/1999 | Barak | 359/618 |
| 6,249,387 B1 | | 6/2001 | Poradish et al. | |

FOREIGN PATENT DOCUMENTS

WO    WO 96/36184    11/1996

* cited by examiner

Primary Examiner—William Dowling
(74) Attorney, Agent, or Firm—Angela N. Nwaneri; Maurice M. Klee

(57) ABSTRACT

A prism (13) for use in a projection system which employs a digital light panel (35) is provided. The prism includes first (19) and second (21) spaced part surfaces which are oriented such that: (a) light from a light source (33) will pass through the spaced apart surfaces to the digital light panel; (b) light from "on" pixels will undergo total internal reflection at the second surface (21) and be directed into the acceptance angle of a projection lens (39); and (c) light from "off" pixels which reflects from the second surface will be directed away from the lens' acceptance angle.

4 Claims, 3 Drawing Sheets

OPTICAL SYSTEMS FOR PROJECTION DISPLAYS

CROSS REFERENCE TO RELATED PROVISIONAL APPLICATION

This application claims the benefit under 35 USC §119(e) of U.S. Provisional Application No. 60/141,443 filed Jun. 29, 1999, the content of which in its entirety is hereby incorporated by reference.

FIELD OF THE INVENTION

This invention relates to optical systems for projection displays and, in particular, relates to optical systems of the type disclosed in U.S. Pat. No. 5,552,922 (the '922 patent), the contents of which are incorporated herein by reference.

BACKGROUND OF THE INVENTION

The '922 patent discloses a system for transmitting illuminating light from a light source to a digital light panel (DLP), and then from "on" pixels of the DLP to a projection lens. Although the system of the '922 patent works successfully, two areas in which that system can be improved to reduce its cost and make it easier to manufacture have been identified.

The first area relates to the tilted airspace between surfaces 18 and 20 of the '922 patent. Because light from "on" pixels passes through this airspace, the airspace can introduce astigmatism and coma into the projected image of the. DLP unless the width and wedge of the airspace are carefully controlled. The need for tight control of the width and wedge of the airspace makes manufacture of the system more difficult.

The second area involves the fact that in the system of the '922 patent, light from "on" pixels passes through both the optical component defined by surfaces 14, 16, and 18 of the '922 patent and the optical component defined by surfaces 12 and 20 of that patent. This means that both of these optical components must be manufactured from high quality glass and must satisfy tight tolerances for surfaces flatness, surface positioning, straie, birefringence, and the like. Such requirements increase the overall cost of the system and are thus undesirable.

SUMMARY OF THE INVENTION

In view of the foregoing, it is an object of this invention to provide an improved optical system for transmitting illuminating light from a light source to a DLP and then from "on" pixels of the DLP to a projection lens. More particularly, it is an object of the invention to provide a system of the general type disclosed in the '922 patent which is easier to manufacture and has reduced cost.

To achieve these and other objects, the invention provides an optical system comprising a light source, a DLP, a projection lens, and a prism having first and second spaced apart surfaces wherein the first and second spaced apart surfaces, the light source, the DLP, and the projection lens are oriented relative to one another such that light from the light source passes through the first and second spaced apart surfaces to the DLP, light reflected from the "on" or "first position" pixels of the DLP is internally reflected at the second spaced apart surface towards the projection lens at an angle such that the light is within the acceptance angle of the projection lens, and light reflected from "off" or "second position" pixels of the DLP is either internally reflected at the second spaced apart surface towards the projection lens at an angle such that the light is not within the acceptance angle of the projection lens or otherwise passes through the prism so that the light is outside of the acceptance angle (see, for example, the uppermost bundle of light 41 in FIG. 3).

Figure 1:
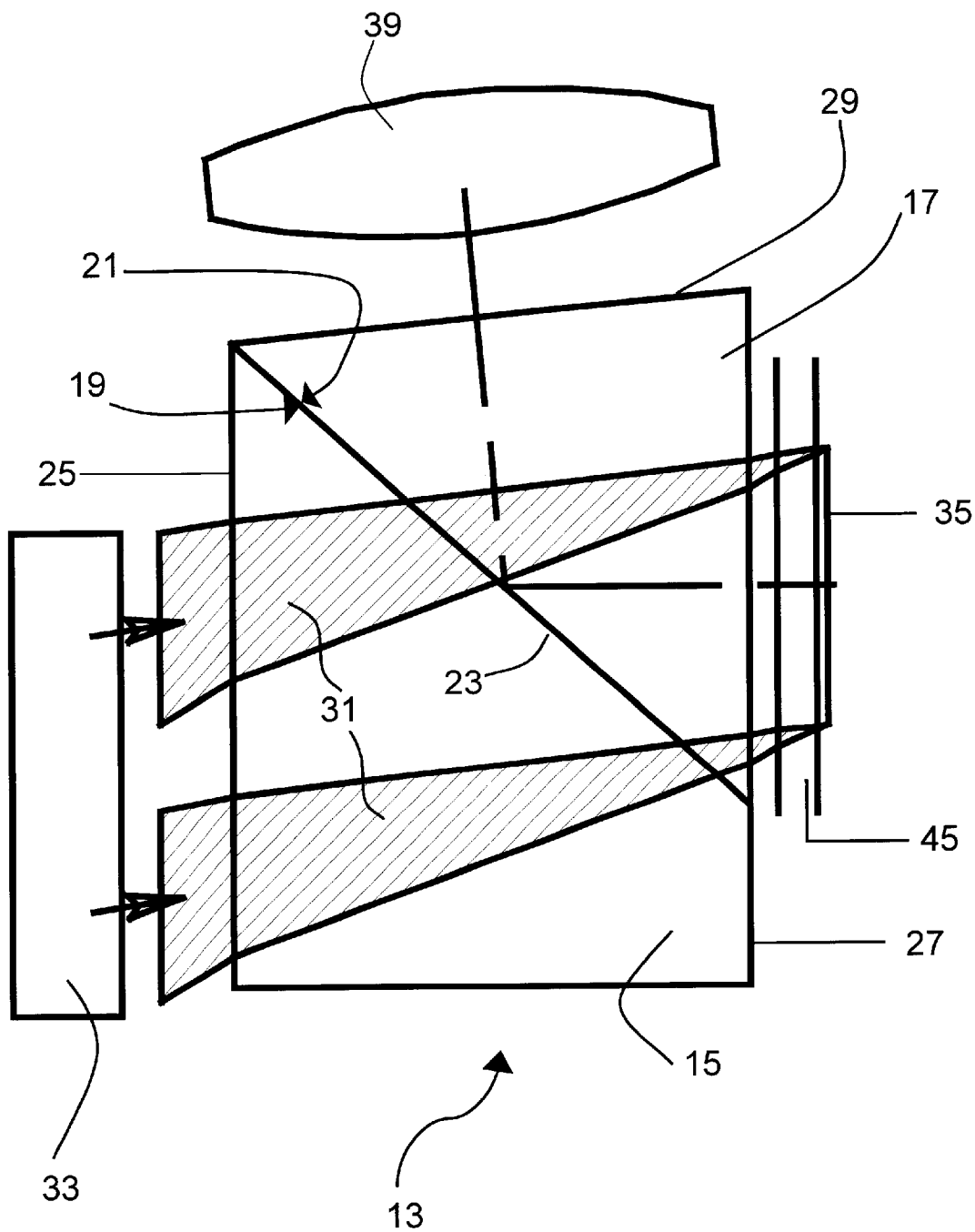
FIG. 1 is a schematic drawing illustrating the passage of light from a light source to a DLP in accordance with the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

The reference numbers used in the drawings correspond to the following:

13 prism
15 prism component
17 prism component
19 first spaced apart surface
21 second spaced apart surface
23 diagonal
25 prism entrance surface
27 prism exit/entrance surface
29 prism exit surface
31 illumination light
33 illumination system
35 DLP
37 light reflected from "on" pixels
39 projection lens
41 light reflected from "off" pixels
43 light ray from "off" pixel
45 DLP cover plate

DESCRIPTION OF THE PREFERRED EMBODIMENTS

As shown in the figures, prism 13 consists of two parts or components 15,17 which are separated by a thin air layer at diagonal 23 of the prism. Surface 19 of component 15 and surface 21 of component 17 face each other along this diagonal and respectively constitute the first and second spaced apart surfaces referred to above.

As shown in FIG. 1, light 31 from illumination system 33 enters into prism 10 through side 25. The angle of incidence of this light on the prism diagonal 23 is less than the critical angle so that this light passes through diagonal 23 and illuminates DLP 35.

Figure 2:
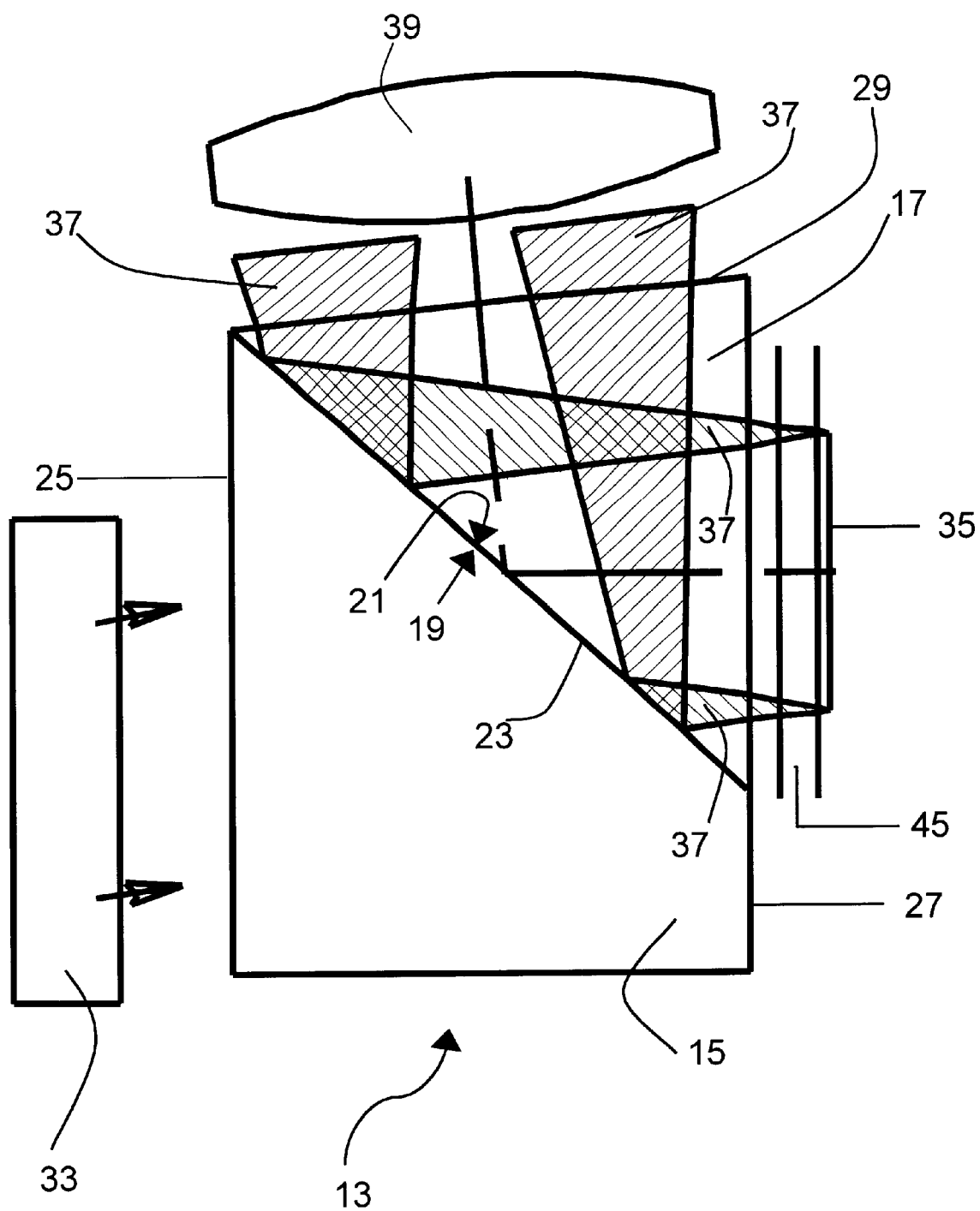
FIG. 2 is a schematic drawing illustrating the passage of light from "on" pixels of a DLP to a projection lens in accordance with the invention.

As shown in FIG. 2, pixels in the "on" position reflect the incident illumination light 31 of FIG. 1 in a direction perpendicular to the active area of the DLP. This light 37 has an angle of incidence on air-spaced diagonal 23 larger than the critical angle and thus 100% of this light is reflected from this diagonal. In particular, reflected light 37 from the DLP strikes surface 21 of component 17 at angle greater than the critical angle defined by the index of refraction of component 17 compared to the index of refraction of air.

Light 37 exits from prism 13 through side 29, which is the mirror image of side 27. This relationship of sides 27 and 29 means that prism component 17, along the light beam 37 reflected from "on" pixels, is in effect a plano-parallel plate. This, in turn, means that prism component 17, the only component which is in the imaging path, does not create coma or astigmatism.

Projection lens 39 is positioned after side 29 to capture the light from "on" pixels and to create the desired image on a viewing screen (not shown).

Figure 3:
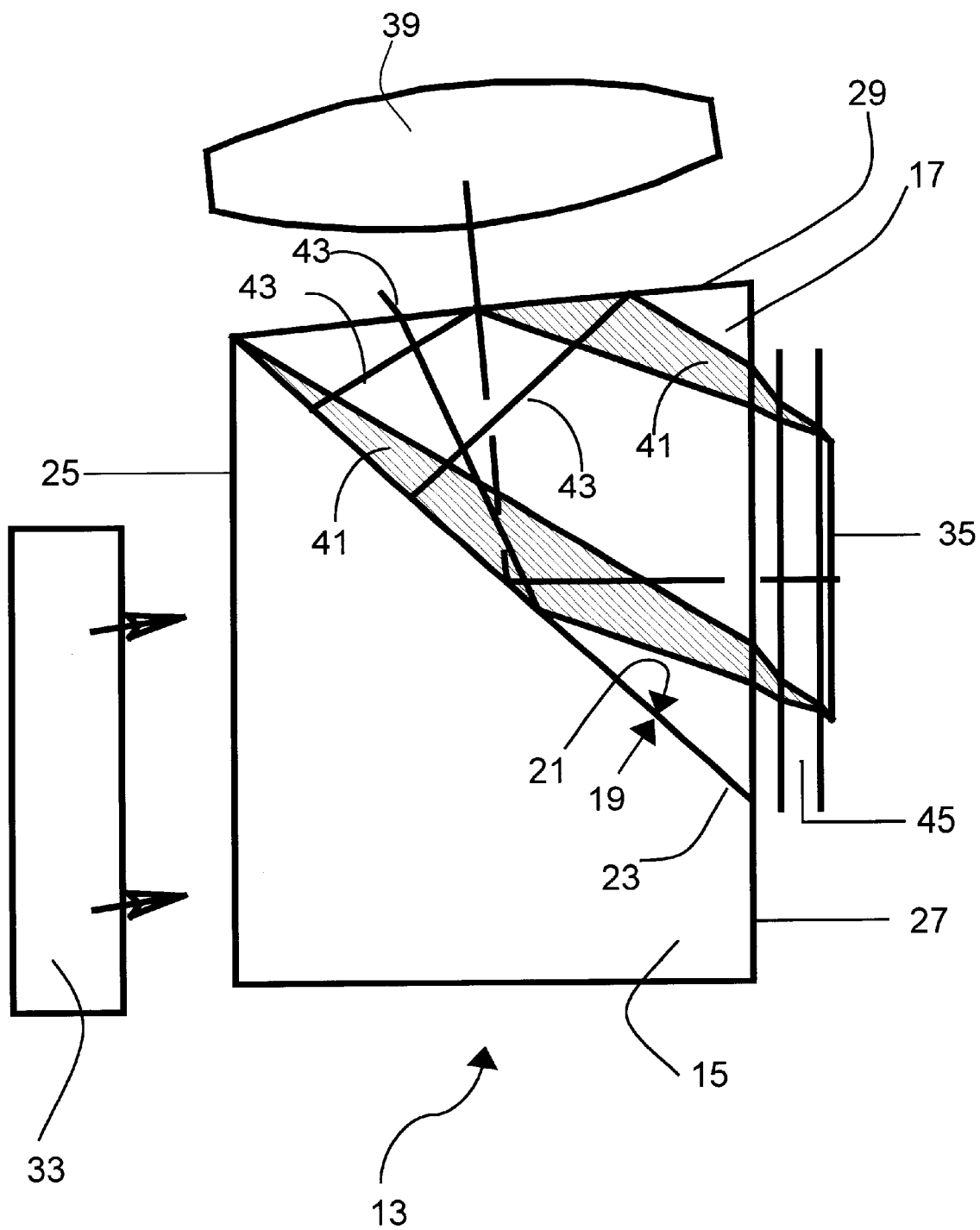
FIG. 3 is a schematic drawing illustrating light paths for light from "off" pixels of a DLP in accordance with the invention.

As shown in FIG. 3, pixels in the "off" position reflect the incident illumination light 31 of FIG. 1 in directions such that the light does not effectively enter the entrance pupil of the projection lens 39 (see, for example, rays 43 in FIG. 3). That is, light 41 from "off" pixels will not be within the acceptance angle of the projection lens.

In practice, sides 25, 27, and 29 of prism 13 have conventional antireflection coatings to minimize Fresnel reflection. Also, spaced apart surfaces 19, 21 have antireflection coatings optimized for an angle of incidence close to the critical angle to reduce the Fresnel losses of illumination light 31.

Instead of being separated by an air layer, surfaces 19 and 21 can be separated by a low index of refraction coating. To maintain a large critical angle at surface 21, component 17 should be made of a high index glass. Component 15 should be made of a similar glass to avoid introducing chromatic and other aberrations into illumination light 31. The advantages of such a coating include ease of assembly of the prism components and elimination of problems due to dust and/or water contamination of the 6 spaced apart surfaces. Such contamination can destroy the ability of total internal reflection at surface 21 to guide light into the projection lens and can lead to high levels of light loss.

As shown in FIGS. 1–3, the DLP is normally protected by a cover plate 45. If desired, this cover plate can be cemented to surface 27, thus removing two glass/air interfaces from the system which reduces Fresnel losses.

As discussed above, the foregoing configuration for the projection system achieves the following advantages:

(1) The width and wedge of the airspace along diagonal 23 does not affect the light path from the "on" pixels to the projection lens. Accordingly, astigmatism and coma associated with this tilted airspace are eliminated.

(2) Only one prism component 17 works in the imaging light path. Accordingly, prism component 15 can be manufactured from lower quality glass without tight tolerances for surface flatness and positioning, straie, birefringence, etc. In this way, the overall cost of the device is lowered.

Although preferred embodiments of the invention have been described herein, further embodiments may be perceived by those skilled in the art without departing from the scope of the invention as defined by the following claims.

What is claimed is:

1. In an image projection system comprising:
(a) a light source which provides illuminating light;
(b) a plurality of selectively adjustable reflecting elements which are arranged in a common plane, said elements being adjustable between at least a first position and a second position;
(c) a lens having a principal plane which is parallel to said common plane; and
(d) a prism positioned between said lens and said plurality of reflecting elements;
the improvement wherein:
(A) the lens has an acceptance angle;
(B) the prism comprises first and second spaced apart surfaces that are oriented relative to the light source, the plurality of reflecting elements, and the lens such that:
(i) light from the light source passes through the first and second spaced apart surfaces to the plurality of reflecting elements, and
(ii) light reflected from reflecting elements in the first position (a) passes through a first reflected-light transmitting side of the prism, (b) is reflected at the second spaced apart surface in directions which are within the lens' acceptance angle, and (c) passes through a second reflected-light transmitting side of the prism;
(C) the system has an image side optical axis which is:
(i) perpendicular to the common plane; and
(ii) undergoes a change in direction at the second spaced apart surface;
(D) the principal plane is parallel to the common plane when translated along the image side optical axis and reflected from the second spaced apart surface; and
(E) the first and second reflected-light transmitting sides of the prism have an internal angle of intersection that is acute.

2. The image projection system of claim 1 wherein:
(i) light reflected from some reflecting elements in the second position is reflected at the second spaced apart surface in directions which are not within the lens' acceptance angle; and
(ii) light reflected from other reflecting elements in the second position passes through the second spaced apart surface.

3. In an image projection system comprising:
(a) a light source which provides illuminating light;
(b) a plurality of selectively adjustable reflecting elements which are arranged in a common plane, said elements being adjustable between at least a first position and a second position;
(c) a lens having a principal plane which is parallel to said common plane; and
(d) a prism positioned between said lens and said plurality of reflecting elements;
the improvement wherein:
(A) the lens has an acceptance angle;
(B) the prism comprises first and second spaced apart surfaces that are oriented relative to the light source, the plurality of reflecting elements, and the lens such that:
(i) light from the light source passes through the first and second spaced apart surfaces to the plurality of reflecting elements, and
(ii) light reflected from reflecting elements in the first position is reflected at the second spaced apart surface in directions which are within the lens' acceptance angle;
(C) the system has an image side optical axis which is:
(i) perpendicular to the common plane; and
(ii) undergoes a change in direction at the second spaced apart surface;
(D) the principal plane is parallel to the common plane when translated along the image side optical axis and reflected from the second spaced apart surface;

(E) the first spaced apart surface is associated with a first component of the prism through which light from the light source passes but light reflected from the reflecting elements in the first position does not pass;

(F) the second spaced apart surface is associated with a second component of the prism through which both light from the light source and light reflected from the reflecting elements in the first position passes; and (G) the first component has a lower optical quality than the second component.

4. In an image projection system comprising:

(a) a light source which provides illuminating light;

(b) a plurality of selectively adjustable reflecting elements which are arranged in a common plane, said elements being adjustable between at least a first position and a second position;

(c) a lens having a principal plane which is parallel to said common plane; and (d) a prism positioned between said lens and said plurality of reflecting elements;

the improvement wherein:

(A) the lens has an acceptance angle;

(B) the prism comprises first and second spaced apart surfaces that are oriented relative to the light source, the plurality of reflecting elements, and the lens such that:

(i) light from the light source passes through the first and second spaced apart surfaces to the plurality of reflecting elements, and (ii) light reflected from reflecting elements in the first position is reflected at the second spaced apart surface in directions which are within the lens' acceptance angle;

(C) the system has an image side optical axis which is:

(i) perpendicular to the common plane; and (ii) undergoes a change in direction at the second spaced apart surface;

(D) the principal plane is parallel to the common plane when translated along the image side optical axis and reflected from the second spaced apart surface;

(E) light reflected from some reflecting elements in the second position is reflected at the second spaced apart surface in directions which are not within the lens' acceptance angle;

(F) light reflected from other reflecting elements in the second position passes through the second spaced apart surface;

(G) the first spaced apart surface is associated with a first component of the prism through which light from the light source passes but light reflected from the reflecting elements in the first position does not pass;

(H) the second spaced apart surface is associated with a second component of the prism through which both light from the light source and light reflected from the reflecting elements in the first position passes; and (I) the first component has a lower optical quality than the second component.

\* \* \* \* \*